Figure 1:
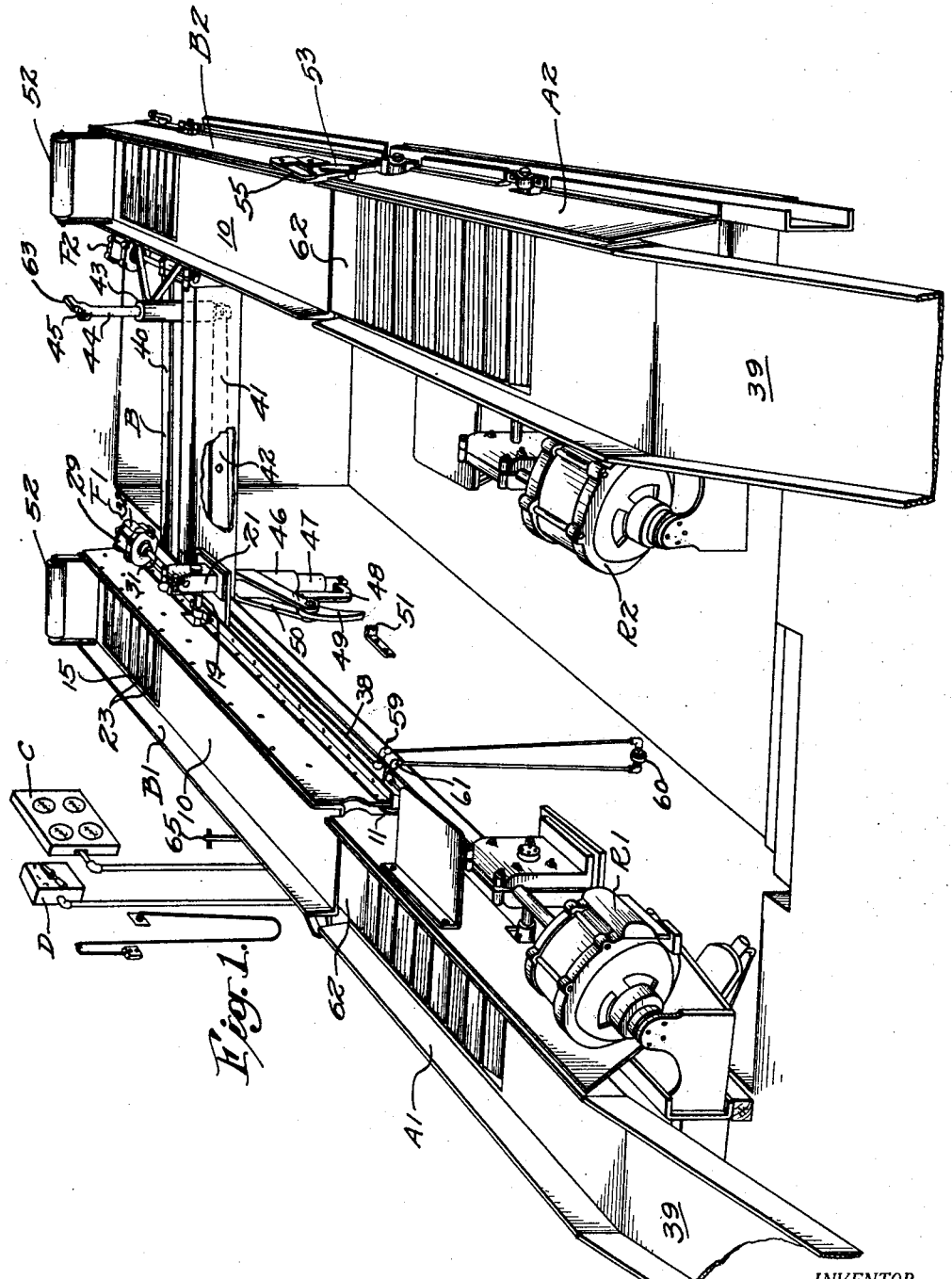

Nov. 15, 1932.  G. SAUNDERS  1,887,721
BRAKE TESTING MACHINE
Filed Sept. 15, 1927  5 Sheets-Sheet 1

INVENTOR.
Gordon Saunders
BY Nestall and Wallace
ATTORNEYS.

Nov. 15, 1932. G. SAUNDERS 1,887,721
BRAKE TESTING MACHINE
Filed Sept. 15, 1927  5 Sheets-Sheet 4

INVENTOR.
Gordon Saunders
BY Westall and Wallace
ATTORNEYS

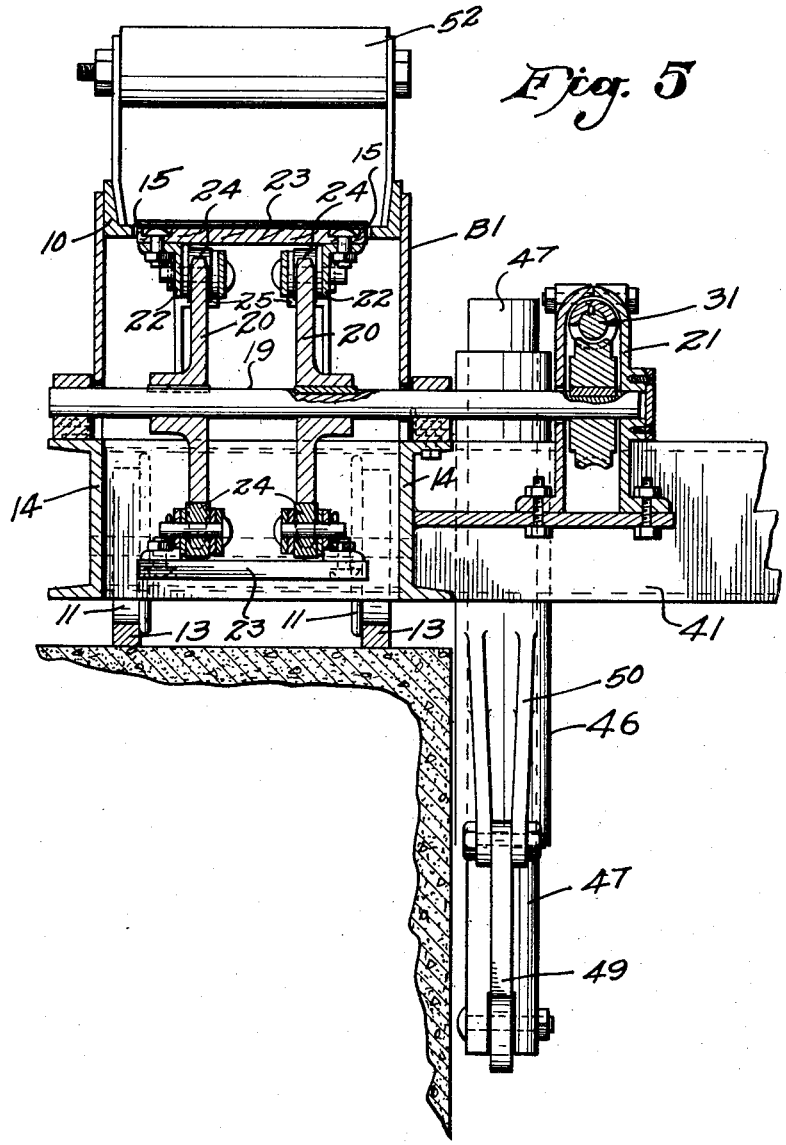

Patented Nov. 15, 1932

1,887,721

UNITED STATES PATENT OFFICE

GORDON SAUNDERS, OF WHITTIER, CALIFORNIA

BRAKE TESTING MACHINE

Application filed September 15, 1927. Serial No. 219,728.

This invention relates to a machine for testing vehicle brakes, especially four wheel brakes such as are used upon automobiles. Brake machines of this character have been developed by providing an endless driving carrier to support the vehicle wheels, means to drive each individual carrier against the resistance of the wheels, and means to measure the driving effort. Heretofore, the driving carriers currently employed have comprised rollers arranged in nests so that each wheel tire would be embraced for a portion of its periphery by several rollers. This has resulted in inaccuracies in determining the braking effort due to the partial absorption by the pneumatic tires of the rollers and the resultant tendency of the wheels to climb out of the rollers nests. It has been the common practice to employ electric motors as the driving means and to measure brake effort by determining the electric current supplied to the motors at a constant voltage. Due to the variations in efficiency of such motors at different loads, another factor contributing to error has been present. The present invention contemplates the employment of endless carriers of the caterpillar type to provide a substantially flat support for each wheel, thus simulating actual running conditions. Another feature is that of measuring the brake effort directly from the torque of the motor, and this is effected by a torquemeter of novel construction. The brake testing units of such machines are commonly mounted in front and rear pairs, the front pair being movable to accommodate their position to automobiles of different wheel bases. Such devices have required means to adjust the position of the pairs, and it has been current practice to do this manually. This requires time and a certain degree of skill. There must be means of locking the pairs in place after proper location has been attained. These operations are commonly performed manually with resultant disadvantages. The primary object of the present invention is to provide a brake machine having a pair of units whose location is automatically adjusted by driving the automobile upon the brake testing machine. A further object of this invention is to provide means to automatically lock the automobile when located. A more specific object of this invention is to provide a brake testing machine having a front carriage including brake testing units, which carriage is automatically movable by the automobile to its proper location. A still further object of this invention is to provide details of structure and novel elements all contributing to efficaciously perform the functions above set forth.

Figure 2:
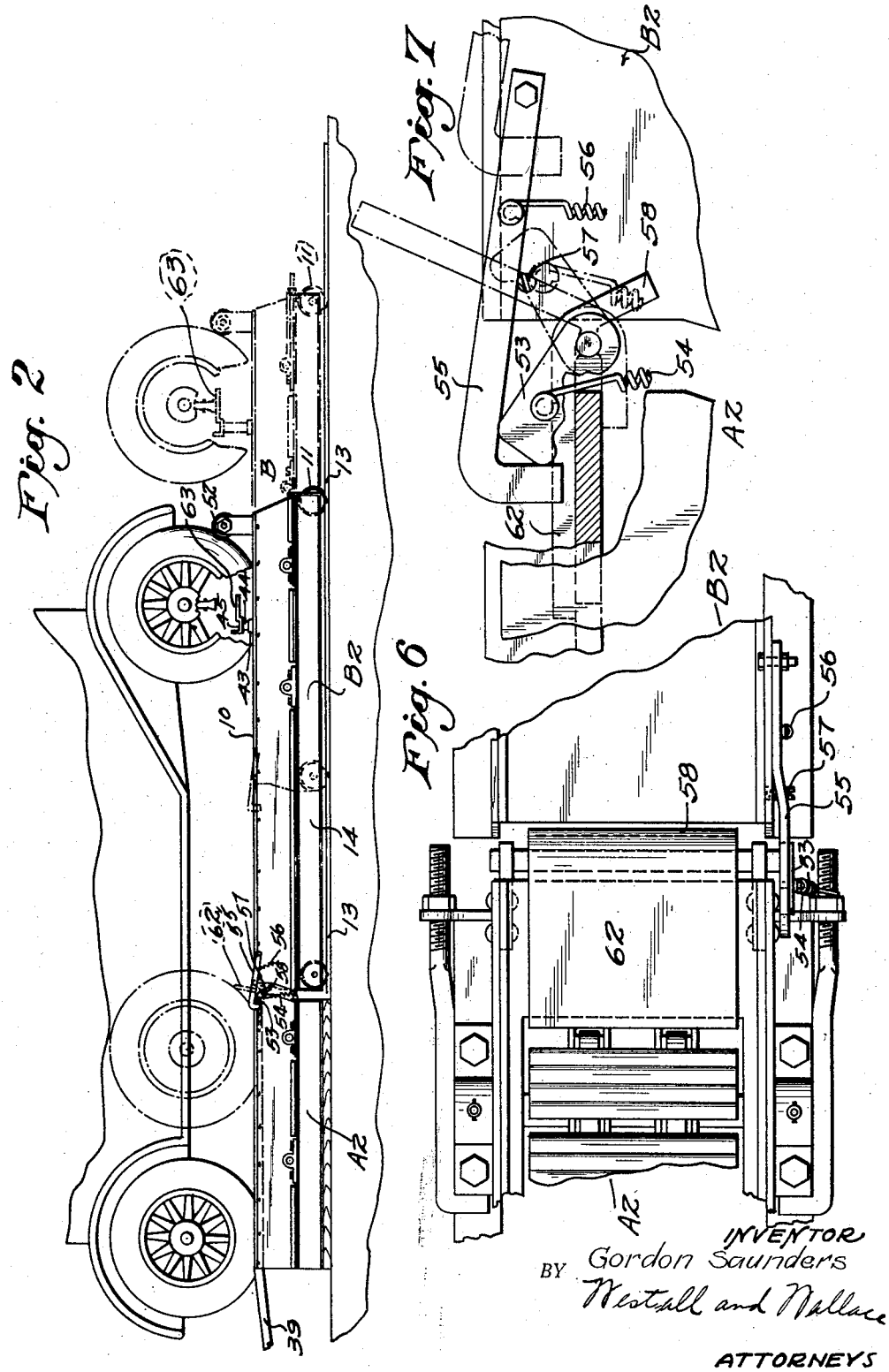
Figure 3:
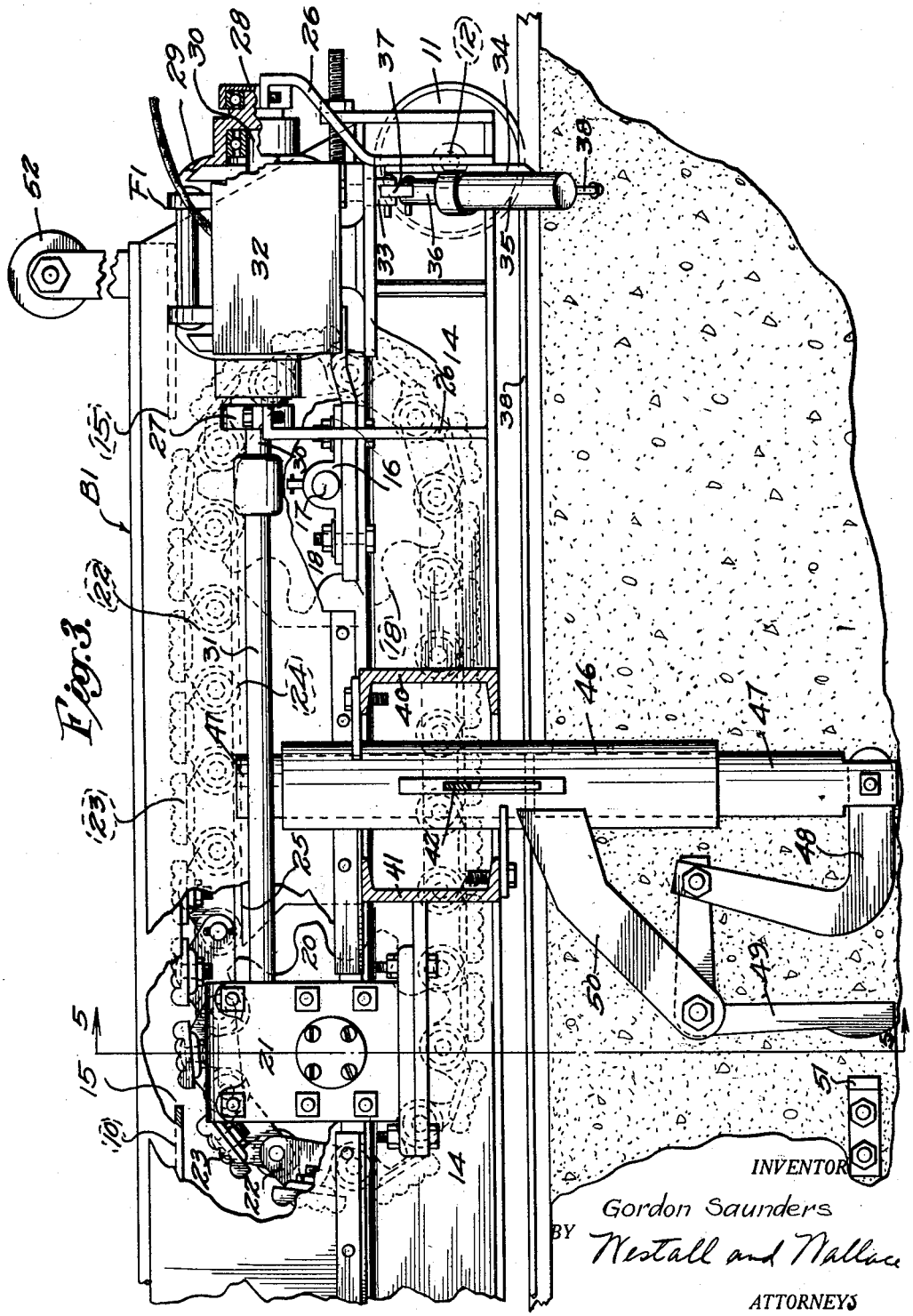
Figure 4:
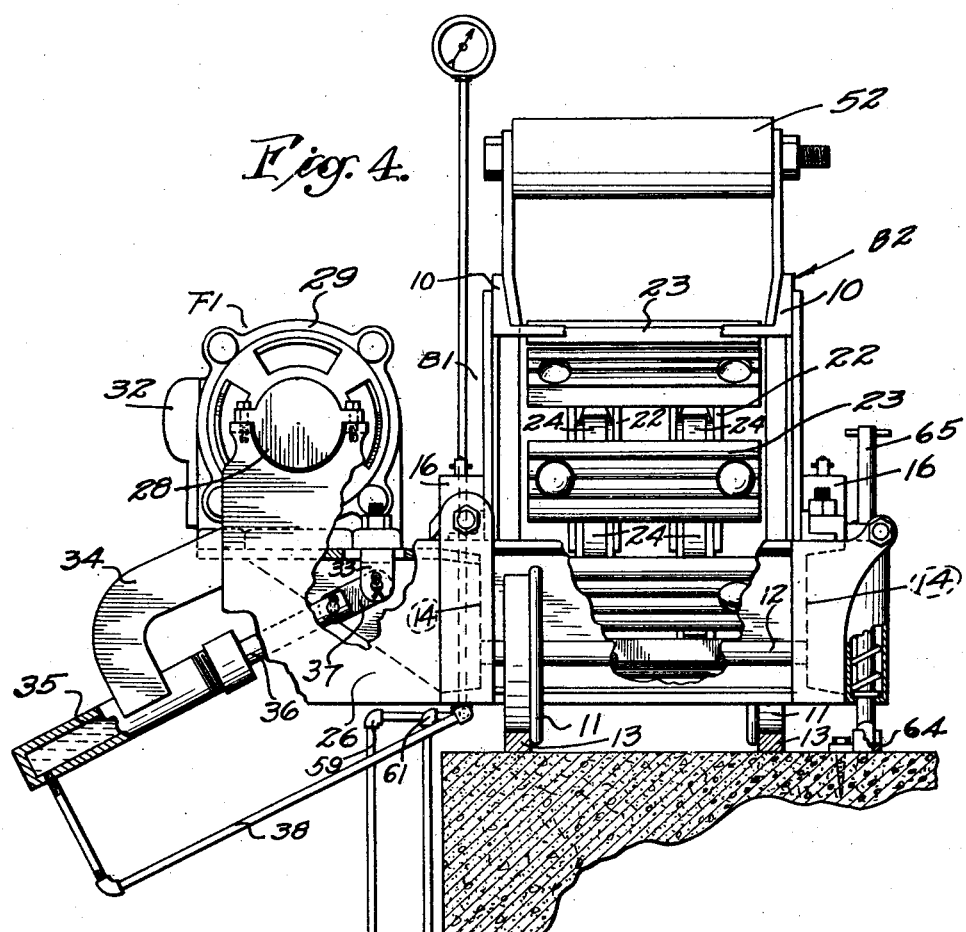
Figure 8:
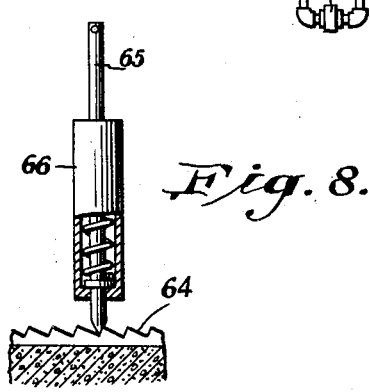

These objects together with other objects and corresponding accomplishments are obtained by means of the embodiment of my invention illustrated in the accompanying drawing, in which:

Fig. 1 is a perspective view of a complete machine, the front carriage being in vehicle receiving position; Fig. 2 is a side elevation showing in full lines an automobile in its initial position on the machine and in dotted lines the final position of the front carriage and automobile; Fig. 3 is a longitudinal section through one of the front carriers; Fig. 4 is a transverse section through the machine showing one of the testing units; Fig. 5 is a section as seen on the line 5—5 of Fig. 3; Fig. 6 is a plan view showing a fragment of the front and rear runways and the coupling therefor; Fig. 7 is an elevation of the structure shown in Fig. 6 partly in section; Fig. 8 is a detailed view of the detent means for holding the carriage against rearward movement.

Referring more particularly to the drawing, the machine is shown installed over a pit. At the rear are a pair of stationary brake testing units, the members of the pair being indicated by A1 and A2. At the front of the machine is a carriage indicated generally by B and including runways B1 and B2. A panel or board C is conveniently mounted and has hydraulic pressure indicators thereon, one for each unit. A selector switch D is provided for obtaining various combinations of the units so that it is unnecessary to operate more than two motors at one time. By providing for such selection, the maximum load on the power line may be kept low, and where the power is paid for upon a maximum demand system, the power bill thus may be kept low.

Referring more particularly to the front unit shown in detail in Figs. 3 and 4, a runway 10 of trough form and preferably of sheet metal is shown. The runway is formed with skirts at the sides overhanging the wheels 11 mounted upon axles 12. The wheels are flanged and ride upon rails 13 which extend for a limited distance along the sides of the pit. This is to provide for movement of the carriage back and forth lengthwise of the pit to accommodate the machine to automobiles having different wheel bases. The skirts preferably are formed by channels 14. The front portion of the floor of the runway is cut away as indicated by 15 and disposed at the opening substantially flush with the bottom is the upper run of a caterpillar thread. Mounted upon the upper flanges of the channels 14 are bearing blocks 16, in which is journaled a shaft 17 extending transverse to the runway at the forward end. Mounted upon the shaft 17 are sprocket wheels 18. At the rear of the opening 15 and extending transverse to the unit is a shaft 19 carrying a pair of sprocket wheels 20 corresponding to the front wheels 19. The shaft 19 is journalled in bearing blocks and extends outwardly into a transmission box or case 21. Transmission case 21 contains suitable reduction gearing for transmitting power from a driving motor to the shaft 19. Passed over the sprockets is an endless carrier comprising links 22 having tread bars 23 attached thereto. The links are in the form of brackets between the ears of which are journalled rollers 24. The rollers ride into the indentations on the sprockets and in the space between the sprockets ride upon rails 25 which support the upper run of the carrier so as to hold the latter in approximately a flat position flush with the floor of the runway. Suitable provision may be made for adjusting the distance between the shafts 17 and 19. This may be accomplished in any well known manner and is for the purpose of taking up slack in the carrier.

A frame 26 is secured to the inner channel 14 adjacent the forward end of the runway and mounted thereon are bearings 27 and 28 to rotatably support the stator 29 of a motor. This provides for rotatably supporting the motor indicated generally by F1. Journalled within the stator is the usual armature shaft 30 which has coupled thereto a shaft 31 extending longitudinally of the runway and forming the driving shaft which enters the transmission box 21. Affixed to the stator housing 29 is a counterweight 32. Depending from the base of the motor housing is a bifurcated post 33. Connected to the bracket 26 so as to be affixed to the inner channel 14 is a bracket arm 34, to which is affixed a hydraulic cylinder 35. Mounted for reciprocation within the cylinder 35 is a plunger 36 secured to the post 33 by means of a connecting link 37. The arrangement is such that upon operating the motor, there will be a reaction between the rotor and stator tending to turn the stator. This is resisted by the plunger 36 through its intermediate connection, and pressure is transmitted to fluid within the cylinder 35. Suitable piping 38 transmits the fluid pressure to its pressure indicating instrument upon the panel C. Obviously, the pressure depends upon the torque of the motor, and this in turn depends upon the load upon the motor and indirectly upon the load upon the carrier. The counterweight 32 will produce a reaction of a fixed value before pressure is transmitted to the fluid within the cylinder. This is convenient, as there is at least a minimum braking effort required for all vehicles, and from this point upward the pressure may be registered. Furthermore the counterweight provides means for adjusting for differences in motors and other conditions. Unit B2 is substantially the same as that just described and has a motor marked F2. Units A1 and A2 are also similar in construction, except that the runways are fixed in position and are not movable. Furthermore, they are provided with ramp portions 39, so that the automobile may be driven upon the runways from the floor.

Bridging the pit and connecting the units B1 and B2 are channels 40 and 41. These serve to secure the units together. Mounted upon a pivotal axis intermediate its ends is a lever 42 disposed between the channels. A tubular column 43 is secured to unit B2, and slidingly mounted therein is a post or anchor 44 having a saddle 45 at its upper end. This saddle is adapted to embrace the axle of an automobile. Secured to the channel adjacent unit B1 is a tubular column 46 having slidingly mounted therein a plunger 47 constituting a weight. The plunger 47 is of sufficient weight to maintain post 43 in its uppermost position. A link 48 of angle form is pivotally connected to the plunger 47 and to a bell crank lever 49.

Bell crank lever 49 is pivotally mounted upon a bracket 50 integral with column 46. The end of lever 49 has its path of travel disposed in line with an abutment 51 on one wall of the pit. At the forward end of each runway of units B1 and B2 are stops 52. These stops are formed by rollers journalled between standards secured to the runways and are positioned so that when the front wheels of automobiles engage the rollers, the wheels will rest upon the carrier treads.

The units A1 and A2 have structures secured in stationary position and are provided with treads to support and carry the rear wheels of the automobile. These treads are operated through mechanisms similar to that already described, certain mechanical variations adapting the mechanisms to their position being included and forming no part of the present invention. The motor and mechanism for unit A1 is generally indicated by R1 and the motor and mechanism for unit A2 by R2. As the units A1 and A2 are substantially the same, only one will be described. A runway having a channel is provided with a cutaway portion at the bottom in which the upper run of a tread mill carrier is disposed. At the forward end of the opening is an apron 62. This apron is pivotally mounted between the sides of the runway so that it may be disposed in its lower position shown in Fig. 1 and in full lines in Figs. 6 and 7 or may be disposed in the upper position shown in dotted lines. The upper position is maintained when the front carriage is uncoupled from the rear units. A crank arm 53 is secured to the apron and disposed on the outer wall of the unit. A spring 54 is connected so that it tends to hold over center the crank arm 53. When the crank arm is swung over center so that the apron 62 is in its upper position, the spring 54 will complete the movement and maintain the apron in its upper position. A tail 58 is provided to arrest any further swinging of the apron. When the apron is moved to its lower position, the spring 54 holds the crank arm over center in the position shown in Fig. 2. For the purpose of moving the apron 62 into its upper position, a catch 55 is pivotally mounted upon the corresponding forward unit. The catch has a hook at the rear end and a spring 56 tending to hold it against a stop pin 57. The forward end of the hook is inclined so that it may ride over the crank arm 53. When the carriage B is in its rear position, it will be coupled to the rear units, by reason of the catches 55 being hooked over the cranks 53. On movement of the carriage forwardly, the catches 55 pull the cranks 53 to swing them over center whereupon springs 54 complete the movement and swing the aprons 62 upwardly. Mounted on a channel 14 is a detent socket 66 in which is slidably mounted a detent post 65 cooperating with a rack 64. A compression spring tends to hold the post in rack engaging position. The detent post and rack when engaged hold the carriage against rearward movement.

Referring particularly to Fig. 1 it will be noted that the tubing leading to the brake unit B1 and marked 38 has swing joints 59 and 60 secured to swing joint 61, from which tubing leads to the indicator on panel C. By such a construction, solid tubing may be used, and this tubing will accommodate itself to the movement of the carriage. The hydraulic tubing connections on unit B2 are of similar form.

The structure operates in the following manner: The carriage is initially in the position shown in Figs. 1 and 2. An automobile is driven upon the runways, the front wheels riding upon the carrier tread of units B1 and B2. The tires engage the rollers 52, and traction of the rear wheels will cause the carriage to be pushed forwardly until the latter ride upon the treads in units A1 and A2. Thereupon, the automobile ceases to travel, the treads being moved. If there is any tendency for the automobile wheels to travel over the treads, the aprons 62 prevent the movement. The anchor post 44 is arranged so that it is disposed immediately beneath the front axle of the automobile. As the carriage was moved forwardly, the arm 49 of the axle locking mechanism moved out of contact with abutment 51. This permitted the counterweight 47 to drop downwardly and thereby move the anchor post 44 upward, the forward lip 63 being beneath the axle and in contact therewith. As soon as the vehicle has reached its forward position, a detent post 65 is engaged with a rack 64 to hold the carriage against rearward movement and the vehicle is then backed up slightly, there being a slight movement to the rear permitting the axle to be moved over the seat in the saddle 45, whereupon the anchor 44 moved upwardly to cause the axle to be disposed within the saddle, and thereby lock the machine in position.

The parts are now ready for operation. By means of the selector switch, any two of the brake testing units may be operated. Power is supplied to the motors selected and the brakes are applied to the vehicle. There is a tendency for the stators to be turned. This tendency is measured by the torque and the brake resistance. The resistance is shown on the corresponding dial on the panel C. The brakes on the automobile may be adjusted so that they produce the effect desired. Thus, the two rear brakes may be adjusted to give the same braking effort. The parts may then be arranged so that the units on one side may have their braking effort indicated. The adjustment of the proper ratio of braking effort between front and rear may then be made. The two front brakes may be adjusted. After the measurement and adjustments have been made, the post 65 is disengaged from rack 64 the automobile is backed up, the carriage B moving rearwardly so that arm 49 engages abutment 51 thereby lowering the anchor 44 and releasing the automobile axle. The catch 55 will have engaged crank 53 and folded the apron stop 62 to its lower position. The hook end of catch 55 will engage over arm 53 and the units at front and rear will have been coupled so as to receive the next automobile.

What I claim is:—

1. In a device of the character described, a rear set of spaced runways disposed side by side, a front set of spaced runways disposed in alignment respectively with the runways of said rear set, said front set being free to travel longitudinally, abutment means on said front set for engagement by a vehicle whereby said front set may be caused to travel, aprons disposed in the runways of the rear sets so as to be elevated into position to arrest the travel of the rear wheels of a vehicle thereover, catches on said front set arranged to elevate said aprons upon separation of said sets and to restore said aprons upon return of said sets, wheel turning means mounted in said runways, and means to drive said wheel turning means.

2. In a device of the character described, a rear set of spaced runways disposed side by side, a carriage having a front set of spaced runways disposed in alignment respectively with the runways of said rear set, said front set being mounted on wheels so as to be free to travel longitudinally, abutment means on said carriage for engagement by a vehicle whereby said carriage may be caused to travel, means operable by travel of said carriage to anchor the vehicle thereto including a post mounted on said carriage for elevation and depression, mechanism for operating said post comprising an actuator mounted on said carriage and a stationary abutment for engagement by said actuator when said carriage is in its rear position so as to hold said mechanism and post in its depressed position, and means operable to elevate said post upon movement of said carriage forwardly, said post having a saddle for the vehicle axle to seat therein.

3. In a device of the character described, a rear set of spaced runways disposed side by side, a carriage having a front set of spaced runways disposed in alignment respectively with the runways of said rear set, said carriage being mounted on wheels so as to be free to travel longitudinally, abutment means on said carriage for engagement by a vehicle whereby said carriage may be caused to travel, means operable by travel of said carriage to anchor the vehicle thereto including a post mounted on said carriage for elevation and depression, mechanism for operating said post comprising an actuator mounted on said carriage and a stationary abutment for engagement by said actuator when said carriage is in its rear position so as to hold said mechanism and post in its depressed position, means operable to elevate said post upon movement of said carriage forwardly, said post having a saddle for the vehicle axle to seat thereon, wheel turning means mounted on said runways, and means to drive said wheel turning means.

4. In a device of the character described, a rear set of spaced runways disposed side by side, a front set of spaced runways in alinement respectively with the runways of said rear set, said front set being free to travel longitudinally, abutment means on said front set for arresting travel of a vehicle thereover whereby the front set may be caused to travel, wheel turning means mounted in said runways, means to drive said wheel turning means, vehicle anchoring means on said front set including an anchor projectable to engage a vehicle disposed on said front set and to lock the vehicle to said set, mechanism for projecting and retracting said anchor, said mechanism being operatively interposed between said sets whereby to cause projection of said anchor upon separation of said sets and retraction upon juncture of said sets.

5. In a device of the character described, a rear set of spaced runways disposed side by side, a front set of spaced runways in alinement respectively with the runways of said rear set, said front set being free to travel longitudinally, abutment means on said front set for arresting travel of a vehicle thereover whereby the front set may be caused to travel, wheel turning means mounted in said runways, means to drive said wheel turning means, vehicle anchoring means on said front set including an anchor projectable to engage a vehicle disposed on said front set and to lock the vehicle to said set, mechanism normally tending to project said anchor to locking position, and retraction means included in said mechanism disposed to be operated by movement of said front set toward juncture of said sets whereby to retract and maintain said anchor in vehicle releasing position.

6. In a device of the character described, a rear set of spaced runways disposed side by side, a front set of spaced runways disposed in alinement respectively with the runways of said rear set, said front set being free to travel longitudinally, abutment means on said front set for engagement by a vehicle whereby said front set may be caused to travel, apron means disposed in the runways of the rear sets so as to be elevated into position to arrest the travel of wheels of a vehicle thereover, catches secured to said front set and engageable with said apron means to elevate the latter upon separation of said sets and to restore said apron means upon return of said sets, and means mounted in said runways to turn the wheels of said vehicle.

7. In a device of the character described, a rear set of spaced runways disposed side by side, a front set of spaced runways disposed in alinement respectively with the runways of said rear set, said front set being free to travel longitudinally, abutment means on said front set for engagement by a vehicle whereby said front set may be caused to travel, apron means disposed in the runways of the rear set so as to be elevated into position to arrest the travel of wheels of a vehicle thereover, catches on said front set disposed to be engaged with and to elevate said apron means upon separation of said sets and to be engaged with and restore said apron means upon return of said sets, vehicle anchoring means on said front set including an anchor projectable to engage a vehicle disposed on said front set and to lock the vehicle to said set, mechanism for projecting and retracting said anchor, said mechanism being operatively interposed between said sets whereby to cause projection of said anchor upon separation of said sets and retraction upon juncture of said sets, and means mounted in said runway to turn the wheels of said vehicle and measure the torque.

8. In a device of the character described, a rear set of spaced runways disposed side by side, a front set of spaced runways disposed in alinement respectively with the runways of said rear set, said front set being free to travel longitudinally, abutment means on said front set for engagement by a vehicle whereby said front set may be caused to travel, apron means disposed in the runways of the rear sets so as to be elevated into position to arrest the travel of wheels of a vehicle thereover, catches on said front set disposed to be engaged with and to elevate said apron means upon separation of said sets and to be engaged with and restore said apron means upon return of said sets, vehicle anchoring means on said front set including an anchor projectable to engage a vehicle disposed on said front set and to lock the vehicle to said set, mechanism normally tending to project said anchor to locking position, and retraction means included in said mechanism disposed to be operated by movement of said front set toward juncture of said sets whereby to retract and maintain said anchor in vehicle releasing position, and means mounted in said runway to turn the wheels of said vehicle and measure the torque.

9. An apparatus for testing brakes of automobiles, comprising in combination, a fixed support provided with means for rotatably supporting a wheel of an automobile, a carriage mounted for movement by the automobile toward and from said fixed support, power mechanism for rotating the wheel resting upon said supporting means, an indicator associated therewith for indicating the action of the brake upon the rotating wheel, wheel arresting means associated with said support and mounted for movement to and from its wheel arresting position, and means under the control of the carriage movement for positioning said wheel arresting means.

10. An apparatus for testing brakes of automobiles, comprising in combination, a fixed support provided with means for supporting and rotating a wheel of an automobile, a carriage mounted for movement toward and from said fixed support and provided with means for supporting and rotating a second wheel of the automobile, power mechanism for actuating said wheel supporting and rotating means, indicating means associated therewith for indicating the action of the brake upon the wheel, wheel arresting means associated with said support and mounted for movement to and from its wheel arresting position, and means for positioning the wheel arresting means and adapted to be actuated by the movement of the automobile relative to the fixed support.

11. An apparatus for testing brakes of automobiles, comprising in combination, a support provided with means for supporting and rotating a wheel of an automobile, power mechanism for driving the wheel supporting and rotating means, an indicator for indicating the action of the brake upon the wheel, wheel arresting means associated with said support and mounted for movement to and from its wheel arresting position, and means for positioning the wheel arresting means and adapted to be actuated by the movement of the automobile relative to said support.

12. An apparatus for testing brakes of automobiles, comprising in combination, a support provided with means for supporting and rotating a wheel of an automobile, power mechanism for driving said wheel supporting and rotating means, an indicator for indicating the turning force applied to the wheel, a platform plate associated with said support and adapted to be moved from a wheel supporting position to a wheel arresting position, and means under the control of the movement of the automobile relative to said support for positioning said plate.

13. An apparatus for testing brakes of automobiles, comprising in combination, means for supporting and rotating the front and rear wheels of an automobile, power mechanism for driving said wheel supporting and rotating means to turn the wheels under brake resistance, means for indicating the turning force applied to each of said wheels to turn it under brake resistance, wheel arresting means for preventing the rear wheel from running off its supporting and rotating means, and means controlled by movement of the carriage for moving the wheel arresting means to its active position as the automobile moves forward and for moving it to its inactive position as the automobile moves rearward.

14. An apparatus for testing brakes of automobiles, comprising in combination, means for supporting and rotating the rear wheels of an automobile, a carriage mounted for movement toward and from said supporting and rotating means and provided with means for supporting and rotating the front wheels of the automobile, power mechanism for driving said supporting and rotating means, indicating mechanism for indicating the brake retarding action on said wheels, and automobile anchoring means adapted to be moved by the travel of said carriage into and out of engagement with an axle of the automobile.

15. An apparatus for testing brakes of automobiles, comprising in combination, means for supporting and rotating the rear wheels of an automobile, a carriage mounted for movement by the automobile toward and from said supporting and rotating means and provided with means for supporting and rotating the front wheels of the automobile, power mechanism for driving said supporting and rotating means, indicating mechanism for indicating the brake retarding action on said wheels, automobile anchoring means mounted on the carriage for movement into and out of engagement with a portion of the automobile being tested, and means controlled by the movement of the carriage for moving the anchoring means into and out of anchoring engagement with the automobile.

16. An apparatus for testing brakes of automobiles, comprising in combination, means for supporting and rotating the rear wheels of an automobile, a carriage mounted for movement by the automobile toward and from said supporting and rotating means and provided with means for supporting and rotating the front wheels of the automobile, power mechanism for driving said supporting and rotating means, indicating mechanism for indicating the turning force applied to said wheels, automobile anchoring means mounted on the carriage for movement into and out of engagement with a portion of the automobile being tested, and means controlled by movement of the carriage to engage said anchoring means with the automobile as the carriage moves forward, and to disengage the anchoring means as the carriage moves toward its rearmost position.

17. An apparatus for testing brakes of automobiles, comprising in combination, a traveling carriage provided with means for supporting and rotating a pair of wheels of an automobile, power mechanism for driving said supporting and rotating means, indicating mechanism for indicating the turning force applied to said wheels, automobile anchoring means mounted on the carriage for movement into and out of engagement with a portion of the automobile being tested, and means controlled by the movement of the carriage for moving the anchoring means into and out of anchoring engagement with the automobile.

18. An apparatus for testing brakes of automobiles, comprising in combination, means for supporting and rotating a wheel of an automobile, power mechanism for driving said means to rotate the wheel under brake resistance, indicating mechanism for indicating the turning force applied to said wheel by said means, and automobile anchoring means for anchoring the automobile in its brake testing position and constructed to be placed in anchoring engagement with the automobile by the movement of the automobile in one direction and to be released from the automobile by the movement of the automobile in the opposite direction.

19. An apparatus for testing brakes of automobiles, comprising in combination, means for supporting and rotating the two opposite wheels of an automobile and constructed so that the automobile may be driven under its own power on and off of said means, power mechanism for driving said means to rotate the wheels under brake resistance, indicating mechanism for indicating the turning force applied to said wheel by said means, automobile anchoring means for anchoring the automobile in its brake testing position, and mechanism for moving the anchoring means automatically to and from its active position and constructed to be controlled by the forward and rearward movement of the automobile.

20. An apparatus for testing brakes of automobiles, comprising in combination, means for supporting and rotating a wheel of an automobile, power mechanism for driving said means to rotate the wheel under brake resistance, indicating mechanism for indicating the turning force applied to said means, anchoring means for holding the automobile in the brake testing position, and mechanism adapted to be actuated by the movement of the automobile to disengage the anchoring means from the automobile.

21. An apparatus for testing brakes of automobiles, comprising in combination, means for supporting and rotating the rear wheels of an automobile, power mechanism for driving said means to rotate the wheels under brake resistance, indicating mechanism for indicating the turning force applied to said wheels by said means, a traveling carriage for supporting the front wheels of the automobile and adapted to be moved by the movement of the automobile to and from its brake testing position, anchoring means for holding the automobile in its brake testing position, and means controlled by the travel of the carriage for moving the anchoring means to and from its active position.

22. An apparatus for testing brakes of automobiles, comprising in combination, means for supporting and rotating the rear wheels of an automobile, power mechanism for driving said means to rotate the wheels under brake resistance indicating mechanism for indicating the turning force applied to said said wheels by said means, a traveling carriage for supporting the front wheels of the automobile and adapted to be moved by the movement of the automobile to and from its brake testing position, anchoring means mounted on the carriage and constructed to hold the automobile in its brake testing position, and mechanism controlled by the movement of the carriage and operable to engage and disengage the anchoring means with the automobile.

23. An apparatus for testing brakes of automobiles, comprising in combination, means for supporting and rotating a wheel of an automobile, power mechanism for driving said means to rotate the wheel, indicating mechanism for indicating the action of the brakes upon the rotating wheel, and automobile anchoring mechanism for anchoring the automobile in its brake testing position controlled for movement into anchoring engagement with the automobile by movement of the automobile to brake testing position and from anchoring engagment with the automobile by movement of the automobile from brake testing position.

24. In combination with a brake testing device for testing the brakes of an automobile, anchoring means associated therewith for anchoring an automobile in the brake testing position, comprising an automobile holding device movable into and out of anchoring engagement with the automobile, and means operable by the movement of the automobile to the brake testing position for engaging said holding device with the automobile and operable by the movement of the automobile away from the brake testing position for releasing the automobile.

25. In combination with a brake testing device for testing the brakes of an automobile, a traveling carriage adapted to be moved by an automobile as the latter moves to and from the brake testing position, anchoring means for anchoring an automobile in the brake testing position, and means operable by the movement of the carriage in one direction for engaging the anchoring means with the automobile and operable by the movement of the carriage in the opposite direction for releasing the automobile.

26. In a vehicle testing apparatus, a base, a support on said base for the rear wheels being tested, a carriage movable toward and from said base for supporting one of the front wheels of the vehicle being tested, means for holding the vehicle on said supports while in testing position, said holding means including releasable retaining means engageable with a portion of said base to release said holding means upon movement of said carriage toward said base.

27. In a vehicle testing apparatus, a support for the rear wheels of the vehicle being tested, a carriage movable toward and from said support for supporting one of the front wheels of the vehicle, testing mechanism the operation of which tends to move the vehicle off said supports, means for holding the vehicle on one of said supports in testing position, including a release for releasing said holding means and means for actuating said release upon movement of the carriage toward said rear wheel support.

In witness that I claim the foregoing I have hereunto subscribed my name this 25th day of August, 1927.

GORDON SAUNDERS.